United States Patent [19]

Streetman

[11] Patent Number: 6,155,047
[45] Date of Patent: Dec. 5, 2000

[54] APPARATUS AND METHOD FOR GENERATING ENERGY

[76] Inventor: Foy Streetman, 401 Chickasha Ave., Chickasha, Okla. 73023

[21] Appl. No.: 09/109,587

[22] Filed: Jul. 2, 1998

[51] Int. Cl.[7] .................................................... E21B 43/00
[52] U.S. Cl. .............................................. 60/398; 166/267
[58] Field of Search ............................. 60/398; 166/265, 166/267

[56] References Cited

U.S. PATENT DOCUMENTS

| | | | |
|---|---|---|---|
| 1,006,912 | 10/1911 | Cook | 52/169.6 |
| 2,454,058 | 11/1948 | Hays | 60/398 |
| 3,330,356 | 7/1967 | Hottman | 166/57 |
| 3,523,192 | 8/1970 | Lang | 290/52 |
| 3,538,340 | 11/1970 | Lang | 290/52 |
| 3,996,741 | 12/1976 | Herberg | 60/398 |
| 4,307,299 | 12/1981 | Norton | 290/52 |
| 4,447,738 | 5/1984 | Allison | 290/44 |
| 5,025,860 | 6/1991 | Mandrin | 166/267 |

*Primary Examiner*—David Bagnell
*Assistant Examiner*—Jennifer R. Dougherty
*Attorney, Agent, or Firm*—R. William Graham

[57] ABSTRACT

An apparatus for generating energy which employs the use of a bore of a well wherein the well has pressurized gas and the apparatus includes a gas trapping member rotatably disposed adjacent the well bore and having a drive shaft fixedly connected thereto, the gas trapping member has a plurality of gas trapping pockets radially peripherally disposed thereon and is disposed in a manner such that as the gas passes from a high pressure zone of the well bore toward a lower pressure zone of the well bore gas is trapped in at least one of the trapping pockets aiding rotation of the gas trapping member. An electric generator is operably connected to the drive shaft such that as the drive shaft rotates, the electric generator generates power. Further, the invention includes a wind turbine operably disposed adjacent the well which is operably connected to an air compressor which is operably connected to an air line which extends into the well having a terminal end in the high pressure zone for emitting air therein. The wind turbine also is equipped to generate electricity. A method is also provided.

15 Claims, 2 Drawing Sheets

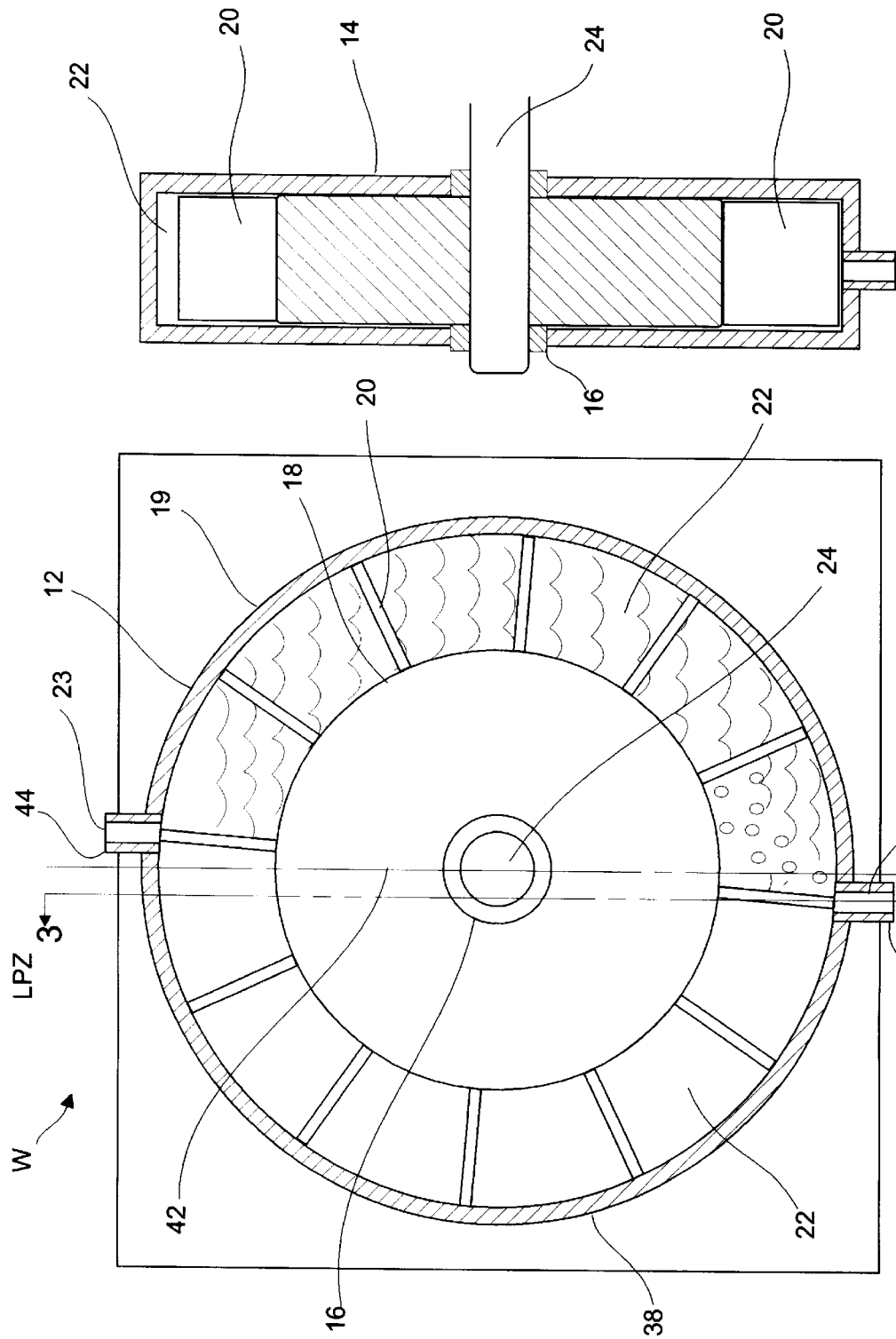

APPARATUS AND METHOD FOR GENERATING ENERGY

BACKGROUND OF THE INVENTION

1. Field of the Invention

The present invention relates generally to the field of energy production. More particularly, the present invention is directed to an apparatus and method for generating energy which is employed for use with a well.

2. Related Art

There exist many types of energy producing devices. Typically, these devices are machines termed "generators" which convert one from of energy into another. For example, it is desirable to covert mechanical energy into electrical, Such devices may include, for example, batteries, dynamos, oscillators, alternators, solar cells and thermocouples. Alternators, for example, are constructed with a stationary armature within which revolves a rotor comprised of a number of field magnets and can be driven by high speed turbines and the current generated is equal to half the number of poles and the number of revolutions per second of the armature with respect to the magnetic fields. This current can be used or stored.

Today's environment mandates the need for energy producing devices which are environmentally friendly as well as efficient. In this regard, wind turbine generators, for example, have become increasingly popular as alternative sources of energy. Wind turbine generators produce electricity by harnessing the wind.

Wind turbine generators are much less harmful to the environment than other sources of energy, but are not always practical because they require average wind speeds of at least 21 km/h (13 mph) and a suitable geographic area which averages such wind speeds. However, under the right conditions, a sufficient number of wind turbines can provide enough electricity to power cities.

Still as helpful as these devices are, there remains a need to improve these energy producing devices. Accordingly, the present invention is intended to improve upon the existing energy producing devices.

BRIEF SUMMARY OF THE INVENTION

It is an object of the present invention to improve energy production.

It is another object to produce energy in an environmentally efficient manner.

It is still another object of the present invention to salvage and convert abandoned well sites for the purpose of providing an alternative environmentally friendly energy.

Accordingly, the present invention is directed to an apparatus for generating energy which employs the use of a bore of a well wherein the well has pressurized gas therein. The apparatus includes a gas trapping member rotatably disposed within the well bore and has a drive shaft fixedly connected thereto, the gas trapping member has a plurality of gas trapping pockets radially peripherally disposed thereon and is disposed in a manner such that as the gas passes from a high pressure zone of the well bore toward a lower pressure zone fo the well bore gas is trapped in at least one of the trapping pockets to aid rotation of the gas trapping member.

An electrical generator is operably connected to the drive shaft such that as the drive shaft rotates, the electrical generator generates electricity to a power station. Further, the invention includes a wind turbine operably disposed adjacent the well which is operably connected to the power station and an air compressor, The air compressor is operably connect to an air line which extends into the well having a terminal end in the high pressure zone for emitting air therein. This air is part of the gas which is used to rotate the gas trapping member and generate electricity.

A method of generating electrical power is also provided. The method includes the steps of causing pressurized gas with a well bore to flow from a high pressure zone to a low pressure zone in a predetermined path and positioning a gas driven electrical generator in the path such that the gas drives the electrical generator to produce electricity. The method further includes the step of pumping pressurized gas into the high pressure zone of the well bore.

Other objects and advantages will be readily apparent to those skilled in the art upon viewing the drawing sand reading the detailed description hereafter.

BRIEF DESCRIPTION OF THE DRAWINGS

FIG. 2 is a cross sectional view of a part of the present invention.

FIG. 3 is another cross sectional view of a part of the present invention through line 3—3 of FIG. 2

DETAILED DESCRIPTION OF THE INVENTION

Figure 1:
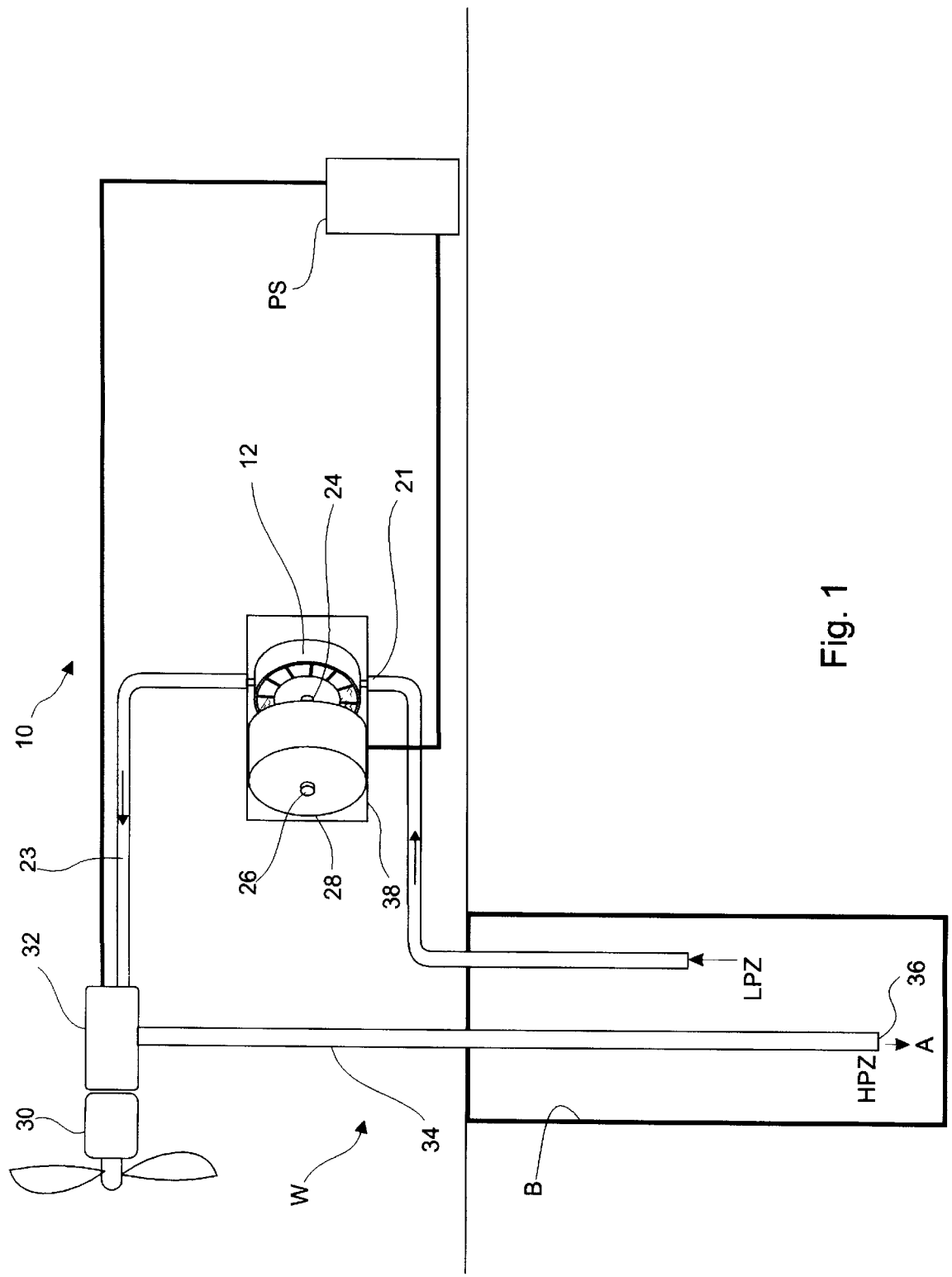
FIG. 1 is a schematic view of the present invention.

Referring to the drawings, the apparatus for generating energy of the present invention is generally referred to by the numeral 10. The apparatus 10 employs the use of a well bore B. The well bore B has pressurized gas therein with a high pressure zone HPZ at the lower portion of the well bore B and a lower pressure zone LPZ in the upper portion of the well bore B. While it is contemplated by the inventor that the present invention may be employed for use in an active well, the embodiment presented is described for utilization with an abandoned well site. In this regard, there are numerous well sites which have been abandoned and have been left a waste objects. The apparatus 10 of the present invention salvages and converts the abandoned well sites for the purpose of providing an alternative source of environmentally friendly energy. The apparatus 10 is disposed adjacent the well bore B.

The apparatus 10 includes a gas trapping member 12 which is here generally shown as a wheel having two circular side surface portions 14 each rotatably sealingly connected to hubs 16. The circular surface portions 14 are sealingly interconnected by a concentric ring 19. A concentric ring 18 and radially extending leaves 20 are fixedly connected ton one another and rotatably disposed with the circular side surface portions 14 and the concentric ring 19. Together the circular side surface portions 14, concentric rings 18 and 19 and radially extending leaves 20 form a plurality of gas trapping pockets 22. The concentric ring 19 has a pair of open conduits 21 and 23 formed generally opposite from one another to permit flow therethrough. The open conduit 21 received incoming air. A therethrough and the open conduit 23 permits exiting of the air A from the gas trapping member 12.

A drive shaft 24 is rotatably disposed through the hubs 16 and is fixedly connected to the ring 18. The drive shaft 24 has one end 26 which is operably connected to an electric generator 28. The electric generator 28 can be of a type known in the art.

The gas trapping member 12 serves as a turbine well with gas trapping pockets arranged on its circumference in such a fashion that the moving fluid exerts a tangential force that turns the leaves 20, ring 18, and drive shaft 24 of the gas trapping member 12 and imparts energy to it. Here, the gas trapping member 12 and its plurality of gas trapping pockets 22 which are radially peripherally disposed thereon is disposed in a manner such that as the gas passes from a high pressure zone HPZ of the well bore B toward a lower pressure zone LPZ gas is trapped in at least one of the trapping pockets 22 to cause rotation of the leaves 20, ring 18 and drive shaft 24 of gas trapping member 12.

Mechanical energy is then transferred through the drive shaft 24 to operate the electric generator 28 which is operably connected to the drive shaft 24. The drive shaft 24 rotates to cause operation of the electrical generator 28 generating electricity to be supplied to a power station PS.

Further, the present invention includes a wind turbine 30 operably disposed adjacent the well bore B. The wind turbine 30 is operably connected to the power station PS and an air compressor 32 such that as the wind turbine 30 rotates, it actuates a compressor piston in the compressor 32 to compress gas into the well W. The air compressor 32 preferably is equipped with an alternative power source, such as electric generator, for producing compressed air when the wind turbine 30 is not operating. The air compressor 32 is operably connected to an air line 34 which extends into the well W having a terminal end 36 in the high pressure zone HPZ communicably connected with the open conduit 23 for receiving return air A therein via a one way check valve.

The gas trapping member 12 and electric generator 28 are operably disposed in a housing 38 which is operably disposed adjacent the well bore B. The housing 38 has an open surface 40 in a lower portion to receive the open conduit 21 therethrough and is slightly offset ton one side of an axis 42 of the housing 38. The housing 38 also includes another open surface 44 formed in an upper portion of the housing 38 to receive the conduit 23 therethrough and is slightly offset to another side of axis 42.

As the air A enters and exits the gas trapping member 12, the drive shaft 24 is caused to rotate and drive the generator 28 which generates electricity to the power station PS. The exiting air A continues to flow through the lower pressure zone LPZ. The well bore B is sealed at its top except for a line 34 and conduit 21 being communicably connected thereto.

The above described embodiment is set forth by way of example and is not for the purpose of limiting the present invention. It will be readily apparent to those skilled in the art that obvious modification, derivations and variations can be made to the embodiment without departing form the scope of the invention. Accordingly, the claims appended hereto should be read in their full scope including any such modifications, derivations and variations.

What is claimed is:

1. An apparatus for generating energy which employs the use of a bore of a well wherein the well has pressured gas and the apparatus includes:

a first gas line through which gas enters said well bore;

a second gas line through which gas exits said well bore;

a gas trapping member having a first conduit through which gas from said second gas line enters said gas trapping member and a second conduit through which said gas exits said gas trapping member, said gas trapping member being rotatably disposed adjacent the well bore and having a drive shaft fixedly connected thereto, said trapping member having a plurality of gas trapping pockets radially peripherally disposed thereon and disposed in an manner such that as gas enters said gas trapping member through said first conduit and exits said gas trapping member through said second conduit, gas is trapped in at least one of said trapping pockets to aid in rotation of said gas trapping member;

a wind turbine operably disposed adjacent the well bore;

an air compressor operably connected to said wind turbine and to said gas trapping member wherein the exiting said gas trapping member through said second conduit is recirculated through said first gas line; and an electric generator operably connected to said device shaft such that, as said drive shaft.

2. The apparatus of claims 1, wherein said air compressor includes an electrical generator.

3. The apparatus of claim 1, wherein said first gas line extends into a lower portion of the well bore.

4. The apparatus of claim 1, wherein said first conduit and said second conduit are opposite from one another.

5. The apparatus of claim 1, wherein said gas trapping member rotates about an axis.

6. The apparatus of claim 5, wherein said first conduit is slightly offset to one side of the axis.

7. The apparatus of claim 6, wherein said second conduit is slightly offset to another side of the axis.

8. The apparatus of claim 1, wherein the gas exiting said gas trapping member through said second conduit is recirculated through said first gas line.

9. A method of generating electrical power employing an apparatus for generating energy using pressurized gas from a well bore said apparatus including a gas trapping member disposed adjacent the well bore, said gas trapping member having a drive shaft fixedly connected thereto and a plurality of gas trapping pockets radially peripherally disposed thereon, wherein said method includes the steps of:

(A) causing pressurized gas within a well bore to enter said gas trapping member through a first conduit and to exit said gas trapping member through a second conduit in a predetermined path wherein said pressurized gas is trapped in at least one of said plurality of trapping pockets on said trapping member causing rotation of said gas trapping member such that mechanical energy is transferred through said drive shaft to operate said electric generator; and (B) recirculating the gas exiting said gas trapping member through said second conduit to said well bore such that said gas drives said electrical generator to produce electricity.

10. The method of claim 9, which further includes the step of pumping pressurized gas into the high pressure zone of the well bore.

11. The method of claim 9, wherein said first conduit and said second conduit are opposite from one another.

12. The method of claim 9, wherein said gas trapping member rotates about an axis.

13. The method of claim 12, wherein said first conduit is slightly offset to one side of the axis.

14. The method of claim 13, wherein said second conduit is slightly offset to another side of the axis.

15. The method of claim 9, wherein the gas exiting said gas trapping member through said second conduit is recirculated to said well bore through a gas line using a gas compressor.

\* \* \* \* \*